United States Patent

[11] 3,630,530

[72] Inventors Valdimir Mackas
Wethersfield;
Walter S. Pomeroy, Avon, both of Conn.
[21] Appl. No. 808,554
[22] Filed Mar. 19, 1969
[45] Patented Dec. 28, 1971
[73] Assignee Textron Inc.
Providence, R.I.

[54] BEARING WITH LOCKED SEAL
5 Claims, 8 Drawing Figs.
[52] U.S. Cl. .................................................. 277/94,
277/137, 308/187.1
[51] Int. Cl. .................................................. F16j 15/54
[50] Field of Search ........................................ 277/90, 94,
95, 136, 137, 168, 189, 235; 308/187.1, 187.2

[56] References Cited
UNITED STATES PATENTS
2,100,113  11/1937  Travis ......................... 308/187.2 X
2,208,700  7/1940   Murden ........................ 308/187.2 X
2,619,369  11/1952  Williams ...................... 308/187.1 UX
2,741,500  4/1956   Large .......................... 277/94
2,967,743  1/1961   Howe, Jr. ..................... 308/187.1
3,285,614  11/1966  McClenathan .................. 277/136 X Primary Examiner—Laverne D. Geiger
Assistant Examiner—Edward J. Earls
Attorney—Sandoe, Hopgood and Calimafde ABSTRACT: The invention contemplates the antirotational locked assembly of a bearing seal ring to one of the rotational elements of a rotary bearing. The rotary bearing element may be a race ring having a circumferentially extending radially open groove for accommodation of a deformable seal member, upon assembly thereto. One or more locking projections displaced out of the body of the bearing element enter the nominal inner volume of the groove, so that upon assembly, the deformable seal material develops the desired locked relation of parts.

PATENTED DEC 28 1971
3,630,530
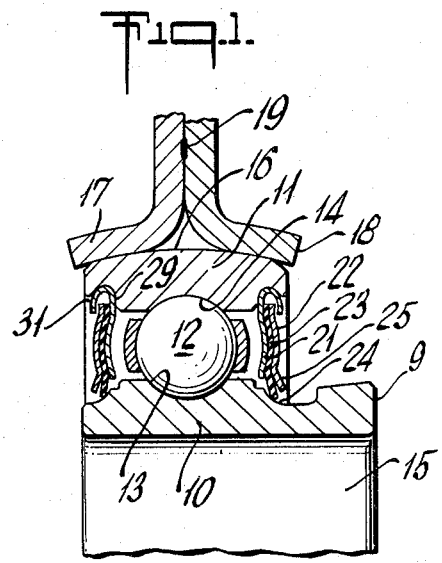
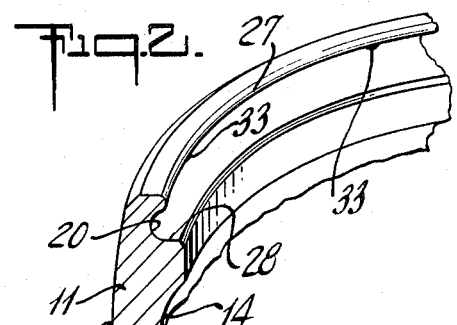
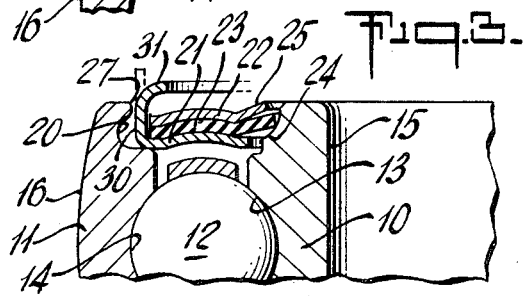
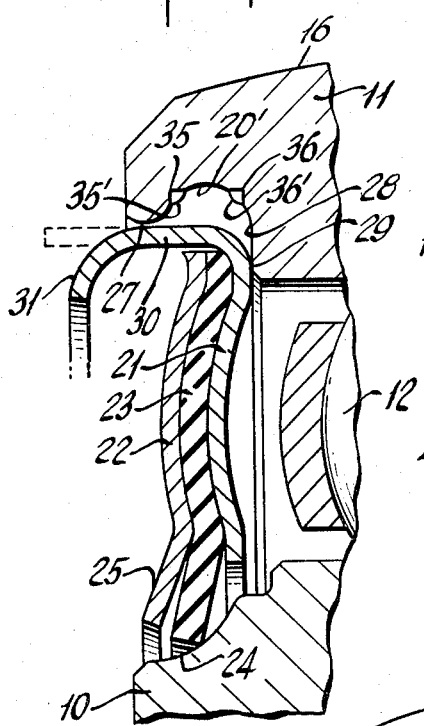
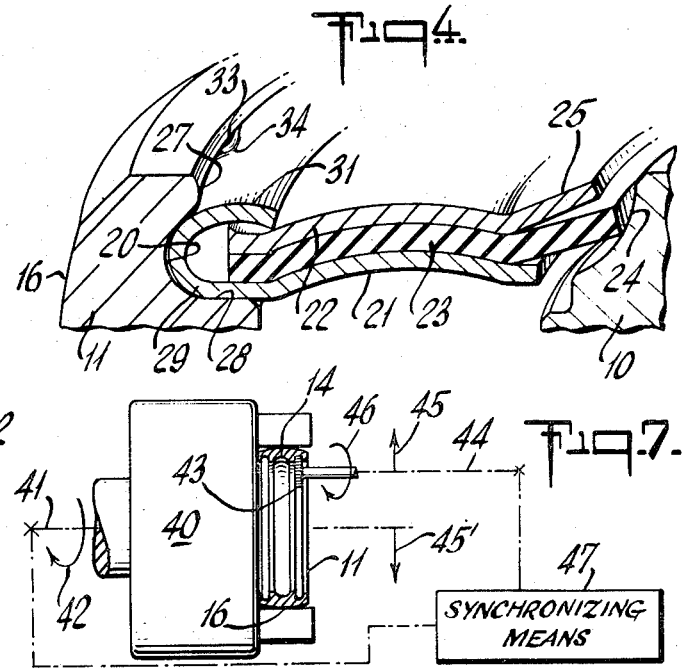
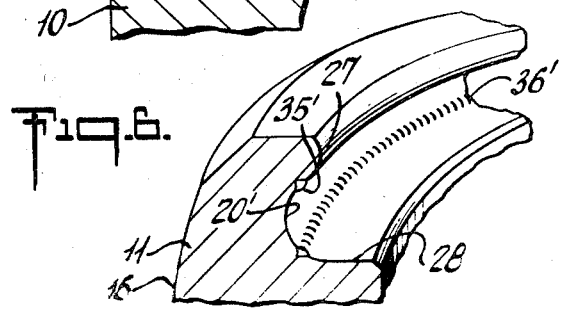
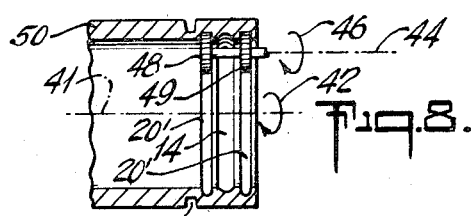
INVENTOR
VLADIMIR MACKAS
WALTER S. POMEROY
BY
Sandoe, Hopgood & Calimafde
ATTORNEYS

BEARING WITH LOCKED SEAL

This invention relates to an improved seal construction and method, for establishing a seal integrated with the assembly of mass-produced bearings, involving relatively rotatable elements.

In bearings of the character indicated, such as antifriction bearings involving inner and outer race rings with interposed antifriction elements, it is desired to pack the moving parts with correct lubricant and to assure both against loss of the lubricant and against contamination by dirt or other foreign matter. Many seal constructions have been proposed and used for accomplishing this purpose, and with admirable efficiency. One general type of seal, known as a crimp seal, involves a preformed deformable sheet metal annulus which may be carried by one race ring and which may itself carry a ring of resilient material, for wiping or sealing engagement with the other ring. The sheet metal is crimped into assembled relation with a supporting groove in the seal-carrying race ring. Difficulties are encountered in assuring a locked relation between the crimped seal and the race ring upon assembly, and this means costly individual inspection of finished bearings, as to seal-locked relationship. If the seal is not adequately locked in place, then under conditions of severe field use, packed accumulations of foreign matter outside and adjacent the bearing may give rise to a differential torque, between the seal ring and its supporting race ring, with resulting degradation of the seal-supporting relationship and ultimate loss of sealing effectiveness.

It is an object of the invention to provide an improved construction and method which will avoid the foregoing deficiencies and difficulties.

It is a specific object to provide a bearing racering construction with inherent antirotational locking effectiveness at the region of seal support.

It is another specific object, for the case of a crimped bearing seal, to provide such character to the surface of the region of seal support on the bearing race ring that the inherent result of a crimped assembly of the seal to the race ring is to establish a positive antirotational locked relation.

It is a general object to achieve the foregoing objects with minimum change of present fabrication and assembly costs, and to reduce the cost of inspection and testing of mass-produced articles while at the same time producing a superior product.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

FIG. 1 is a fragmentary sectional view of a sealed bearing incorporating the invention;

FIG. 2 is an enlarged fragmentary view in perspective of the outer bearing ring of FIG. 1;

FIG. 3 is a fragmentary sectional view to illustrate an assembly step in applying the seal to the outer bearing ring of FIG. 1;

FIG. 4 is a fragmentary perspective view, presenting a section similar to that of FIG. 3, to illustrate completion of assembly of the seal to the outer bearing ring;

FIG. 5 is an enlarged fragmentary sectional view, similar to FIG. 1, to illustrate a modification;

FIG. 6 is an enlarged fragmentary view in perspective, similar to FIG. 2, but to illustrate the modified outer bearing ring of FIG. 5; and FIGS. 7 and 8 are simplified schematic diagrams to illustrate the modified method involved in the construction of FIG. 5.

Briefly stated, the invention contemplates the antirotational locked assembly of a bearing seal ring to one of the rotational elements of a rotary bearing. The rotary bearing element may be a race ring having a circumferentially extending radially open groove for accommodation of a deformable seal member, upon assembly thereto. One or more locking projections displaced out of the body of the bearing element enter the nominal inner volume of the groove, so that upon assembly, the deformable seal material develops the desired locked relation of parts.

Referring to FIG. 1 of the drawings, the invention is shown in application to an antifriction bearing comprising an inner race ring 10, and outer race ring 11, and interspersed antifriction elements or balls 12 riding the respective raceways 13-14 of rings 10-11. The bore 15 of inner ring 10 may receive a shaft (not shown), and may be locked to the shaft by use of an eccentric locking collar (not shown) engaged to the suitably formed end 9 of the inner ring 10. The outer surface 16 of the outer ring 11 may be spherical, to provide a self-alignment function in conjunction with a suitably formed concave mounting seat, as for example that provided between two oppositely dished openings of plate members 17-18, which may be spot-welded or otherwise secured at 19 to retain assembly.

The bearing of FIG. 1 incorporates like seal structures at each end. These seals are of the so-called crimped variety and are each carried by the outer ring 11 at grooves 20, between the balls 12 and the respective axial ends of the bearing. The particular seals shown comprise a deformable sheet-metal ring 21, an outer sheet-metal ring 22 and one or more interposed resilient rings or washers 23 of elastomeric material such as Buna-n sandwiched therebetween. The radially inner lip of washer 23 projects into lightly axially loaded resilient wiping contact with a concaved shoulder 24 formed in the adjacent outer edge of inner bearing ring 10. An outwardly flared skirt 25 of the outer seal ring 22 diverges slightly from the deflected resilient lip so as to protect the seal contact region without interfering with the described lightly loaded seal action.

The seal groove 20 is shown adjacent the outer end wall of the bearing ring 11, thereby defining a circumferentially continuous radial lip 27 which defines the outer axial wall of groove 20. The inner axial wall of groove 20 is defined by a radial shoulder 28, and the groove 20 is of generally arcuate sectional contour between walls 27-28. Shoulder 28 extends radially further toward the other bearing ring 10 than does lip 27, so that the uncrimped preassembly of seal parts may pilot or locate at lip 27 and shoulder 28. As shown in FIG. 3, the deformable sheet metal seal ring 21 is initially formed with a radial flange portion 29 to axially locate against shoulder 28, and with a contiguous axially extending cylindrical flange portion 30 which is coaxially piloted by lip 27. It is optional whether the axial end of flange 30 is straight cylindrical (as shown in dashed outline in FIG. 3) or is inwardly flared as shown in solid outline at 31. Regardless of this end formation, crimping action involves driving engagement with the outer lip 31, with its resulting axial and radial deformation, to conform to the groove contour and assure axial retention between walls 27-28. Lip 31 also is driven against steel plate 22 to compress the resilient seal sandwich. To achieve this action and result the thickness of sheet metal in seal ring 21 is less than half the axial width of groove 20, and, for the particular seal shown, the groove width exceeds or approximates the combined compressed thickness of flange 29, washer 23, seal ring 22 and lip 31.

In accordance with the invention, antirotational engagement of the crimped seal with respect to the seal-supporting bearing ring 11 is achieved by one or more local indentations or projections of bearing-ring metal into that space which may be termed the nominal volume of groove 20, as the latter has thus far been described. In the form of FIGS. 1 to 4, this displacement of metal occurs at one or more localized detents 33 formed axially in the lip 27 which constitutes the axially outer wall of groove 20. Detent 33 may be formed after machining the bearing ring 11 but before the usual heat treating to final hardness; in other words, reliance is placed on the relative ductility of ring 11 prior to hardening. Of course, when ring 11 is finished and ready to assemble, i.e., after hardening, the detent 33 will be hard compared to the deformable sheet metal of ring 21, so that crimping the seal in place necessarily also achieves permanent antirotational locked engagement at 33, by formation of a depression or dimple 34 (FIG. 4). And it will be noted that, regardless of the number and location of detent projections 33, there can be no impairment of seal mounting location or sealing effectiveness; the rounded contour of the crimped lip 31 still fills the groove 20, and flange 29 still locates with circumferential continuity against shoulder 28.

The embodiment of FIGS. 5 to 7 employs similar principles but achieves the desired result with increased effectiveness, all without presenting any change in external appearance, as compared with past crimped seal assemblies. Moreover, the embodiment of FIGS. 5 to 7 lends itself more readily to mass production and is thus preferred.

In FIGS. 5 to 7, the displaced bearing ring metal occurs as a circumferentially extending succession of ridges extending generally radially inwardly and projecting into the nominal groove volume from within the groove at a deeper location. This is achieved by a knurling tool which may be operative on one or the other of the side walls 27–28 within groove 20 but which preferably slightly clears the widest limits of both walls 27–28 and symmetrically operates on both converging ends of these walls near, and preferably short of, the extreme depth or bottom of groove 20. The knurl tool is therefore preferably cylindrical, with a diameter substantially less than the ring (11) diameter, with an axial extent less than the maximum width of groove 20, and with uniform radially outward knurl teeth.

The knurled formations are seen in !FIG. 5 to comprise like indentations 35–36 into the body of ring 11 at lower converging ends of groove walls 27–28, near the bottom of the groove. These indentations are accompanied by outward projection of displaced metal into the nominal volume of groove 20, as suggested at 35'–36'. Projections 35'–36' are symmetrically positioned on opposite axial sides of the groove bottom 20'. Preferably, the knurl tool is a toothed wheel and is positioned so that its pitch diameter has theoretical rolling contact with the symmetrically convergent groove walls; in this circumstance, relatively sharp edges characterize projections 35'–36'

After knurling, the bearing ring (11) is heat treated and otherwise finished for final assembly. And upon assembling the seal, with the described crimp operation, the crimped bead of the seal lip 31 becomes firmly wedged between walls 27–28 and interlocked to the projections 36'–36' in these walls. The result is an antirotation locked assembly, with fully the sealing effectiveness of prior assemblies.

FIG. 7 illustrates the preferred technique of knurling. The bearing ring 11 is shown supported in suitable chucking means 40 mounted for rotation about a support axis 41 and conventionally driven as suggested by arrow 42. The knurl tool 43 is also supported for rotation on its axis 44 which is held (by means not shown) against rotation with respect to the chuck axis 41, and at such radial offset from axis 41 as to accomplish knurling. During the knurl operation, the knurl axis 44 is displaced radially outwardly of chuck axis 41, as suggested by arrows 45–45'. Preferably, knurl 43 is driven in rotation (as suggested by arrow 46); this may be effected by the usual reliance upon work contact to drive the knurl. Alternatively, synchronizing means 47 involving gearing of conventional design may supply drive torque to the knurl tool; heavy phantom lines schematically suggest knurl drive by pickoff from the drive to chuck 40. FIG. 8 illustrates that the knurl operation may be performed in tamdem, at 48–49 on the same tool support axis 44, and that this operation may be performed on the tubular stock 50, chucked in the conventional manner for automatic production and prior to cutoff of the machined part, at 51.

It will be seen that we have described an improved seal construction and method which is simply adapted to conventional bearings and seals and which results in complete assurance against seal rotation in use. This assurance is such as to eliminate need for individual product inspection and/or testing as to seal rotation, thus effecting an important cost economy in addition to the technical improvement.

Although the invention has been described in detail for the preferred forms and methods shown, it will be understood that modifications may be made without departing from the invention as defined in the claims.

What is claimed is:

1. A bearing comprising inner and outer relatively rotatable bearing elements and an annular seal carried by one of said elements and extending into sealing relation with the other of said elements at one axial end of the bearing, said one element being relatively hard and having a circumferential groove facing the other of said elements, an integral part of the wall of the groove including a local discontinuity involving a local projection into the nominal included volume of the groove, said seal including an annular deformable metal ring member deformed into seated relation in the groove and into locked engagement with said projection, whereby said locked engagement is effected in the course of deformation and assures against relative rotation between said seal and said one bearing element.

2. A bearing according to claim 1, in which said one bearing element in an annular ring with a generally radial sidewall closely adjacent the annular groove, said local projection being a locally displaced integral fragment of said sidewall into the nominal volume of the groove to define a local detent in the otherwise smooth circumferential continuity of the adjacent side surface of the groove.

3. A bearing according to claim 1, in which said local projection is one of a plurality of angularly spaced similar projections into the nominal volume of the groove.

4. A bearing according to claim 3, in which said projections are closely and regularly spaced about a circumferential path in the groove.

5. A bearing comprising inner and outer relatively rotatable bearing rings and an annular seal carried by one of said rings and extending into sealing relation with the other of said rings at one axial end of the bearing, said one ring being relatively hard and having at said axial end a circumferentially continuous radially open seal-supporting groove facing the other ring, a generally radial shoulder defining the axially inward side of the groove, a generally radial lip defining the axially outward side of the groove, said shoulder extending into greater radial proximity to the other ring than said lip, an integral part of the wall of the groove including a local discontinuity characterized by a local projection into the nominal included volume of the groove, said seal including an annular deformable sheet metal ring deformed into seated relation in the groove and into locked engagement with said projection, the sheet metal thickness of said seal ring being less than half the axial separation of the groove walls defined by said shoulder and by said lip, the main body of said seal ring being in circumferentially continuous abutment with said shoulder and curled around the bottom of the groove and into circumferentially extending crimped relation with said lip, whereby said locked engagement is effected in the course of deformation and assures against relative rotation between said seal and said one ring element.

* * * * *